(12) United States Patent
Misumi

(10) Patent No.: US 12,738,161 B2
(45) Date of Patent: Sep. 15, 2026

(54) DISPLAY CONTROL DEVICE AND DISPLAY CONTROL METHOD

(71) Applicant: Nissan Motor Co., Ltd., Kanagawa (JP)

(72) Inventor: Ryuma Misumi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 19/127,293

(22) PCT Filed: Nov. 10, 2022

(86) PCT No.: PCT/JP2022/041969

§ 371 (c)(1),
(2) Date: May 5, 2025

(87) PCT Pub. No.: WO2024/100855

PCT Pub. Date: May 16, 2024

(65) Prior Publication Data

US 2026/0179486 A1 Jun. 25, 2026

(51) Int. Cl.
*G08G 1/0967* (2006.01)
*B60K 35/29* (2024.01)

(52) U.S. Cl.
CPC ....... *G08G 1/096783* (2013.01); *B60K 35/29* (2024.01)

(58) Field of Classification Search
CPC . B60K 35/29; G08G 1/096783; B60W 50/14; B60W 2050/146; B60W 30/06;
(Continued)

(56) References Cited

U.S. PATENT DOCUMENTS

| | | | | |
|---|---|---|---|---|
| 2022/0024316 | A1* | 1/2022 | Suzuki | B60K 35/28 |
| 2022/0262128 | A1* | 8/2022 | Nakamura | G08G 1/166 |

FOREIGN PATENT DOCUMENTS

| | | |
|---|---|---|
| JP | 2000177513 A | 6/2000 |
| JP | 2019027996 A | 2/2019 |

(Continued)

*Primary Examiner* — Hossam M Abd El Latif
(74) *Attorney, Agent, or Firm* — Osha Bergman Watanabe & Burton LLP

(57) ABSTRACT

A display control device includes a controller that controls a display device. The controller: obtains information on a surrounding condition of a subject vehicle; identifies an obstacle from the information on the surrounding condition; obtains a traveling route of the subject vehicle; causes the display device to display the obstacle and the traveling route, the obstacle being positioned within a predetermined expanded area in which the traveling route is expanded in a width direction; performs a safety check necessary for the subject vehicle to travel along the traveling route under autonomous traveling, on a basis of the surrounding condition; and reduces a size of the expanded area including a first area in which the safety check has been completed than a size of the expanded area including a second area other than the first area when the first area and the second area are present on the traveling route. A first obstacle approaching the traveling route or possibly approaching the traveling route is displayed on the display device when the first obstacle is positioned outside the expanded area. A degree of display highlighting of a second obstacle moving away from the traveling route or possibly moving away from the traveling route is lower than a degree of display highlighting of the obstacle other than the second obstacle, or the second obstacle is not displayed on the display device, when the second obstacle is positioned within the expanded area.

7 Claims, 9 Drawing Sheets

(58) Field of Classification Search
CPC ........... B60W 2420/403; B60W 30/09; B60W 2554/00; B60W 30/0956; B60W 40/02; B60W 2050/143; B60W 30/08; B60W 10/20; B60W 2420/408; B60W 2520/10; B60W 10/18; B60W 2552/50; B60W 30/095; B60W 60/001; B60W 2554/802; B60W 2554/80; B60W 2556/50; B60W 2554/20; B60W 2554/4041; B60W 2540/18; B60W 40/105; B60W 2556/45; B60W 40/08; B60W 2420/54; B60W 2554/4029; B60W 30/0953; B60W 10/04; B60W 2540/215; G06V 10/778; G06V 10/58; G06V 10/75; G06V 10/94; G06V 10/52; G06V 10/96; G06V 20/44; G06V 20/62; G06V 40/168; G06V 40/174; G06V 10/225; G06V 10/457; G06V 10/763; G06V 40/166; G06V 2201/10; G06V 10/76; G06V 10/809; G06V 20/80; G06V 10/245; G06V 10/42
USPC ........................................................... 701/25
See application file for complete search history.

(56) References Cited

FOREIGN PATENT DOCUMENTS

| | | |
|---|---|---|
| JP | 2019036826 A | 3/2019 |
| JP | 2020024570 A | 2/2020 |

* cited by examiner

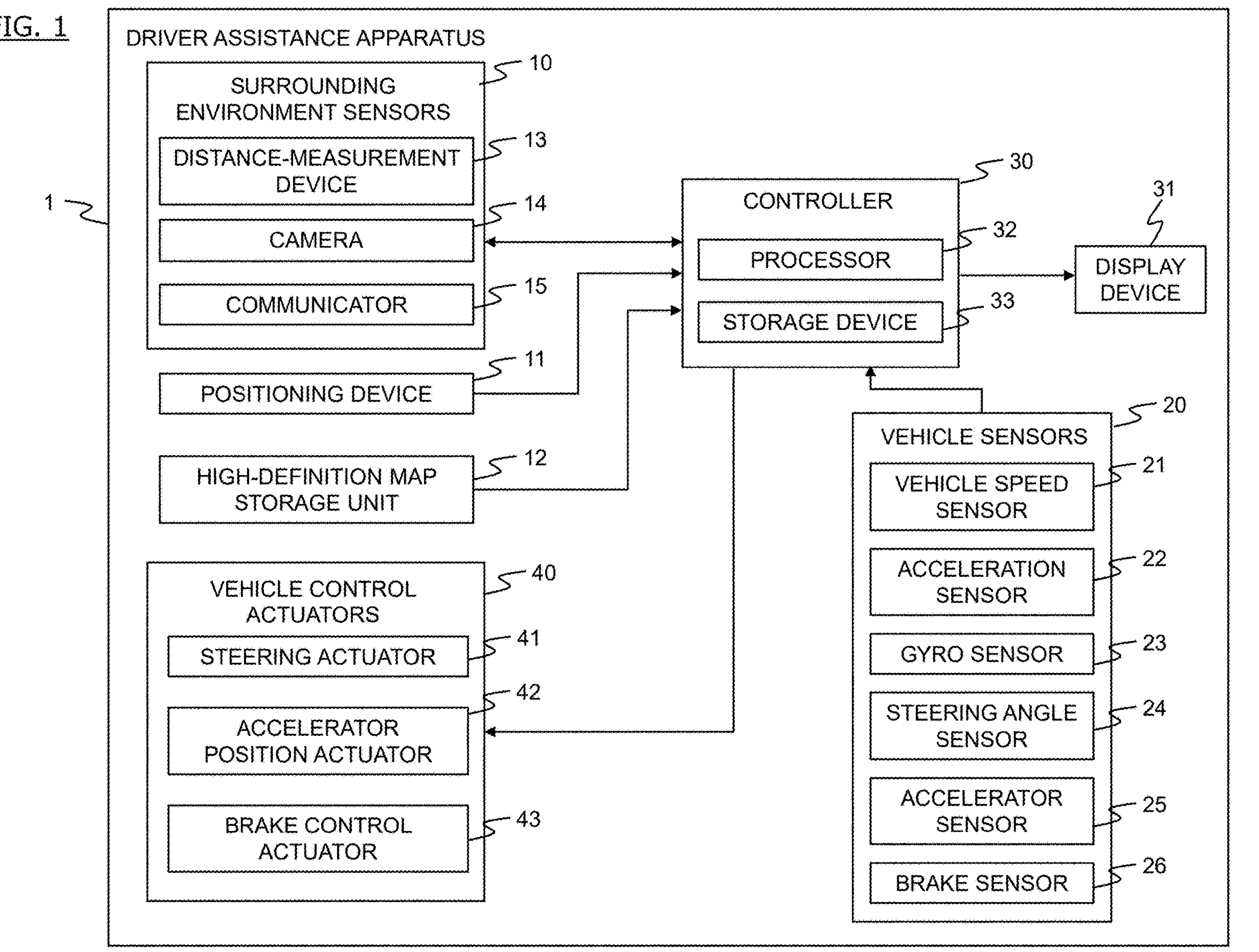
FIG. 1
1
DRIVER ASSISTANCE APPARATUS
10
SURROUNDING ENVIRONMENT SENSORS
13
DISTANCE-MEASUREMENT DEVICE
14
CAMERA
15
COMMUNICATOR
11
POSITIONING DEVICE
12
HIGH-DEFINITION MAP STORAGE UNIT
40
VEHICLE CONTROL ACTUATORS
41
STEERING ACTUATOR
42
ACCELERATOR POSITION ACTUATOR
43
BRAKE CONTROL ACTUATOR
30
CONTROLLER
32
PROCESSOR
33
STORAGE DEVICE
31
DISPLAY DEVICE
20
VEHICLE SENSORS
21
VEHICLE SPEED SENSOR
22
ACCELERATION SENSOR
23
GYRO SENSOR
24
STEERING ANGLE SENSOR
25
ACCELERATOR SENSOR
26
BRAKE SENSOR

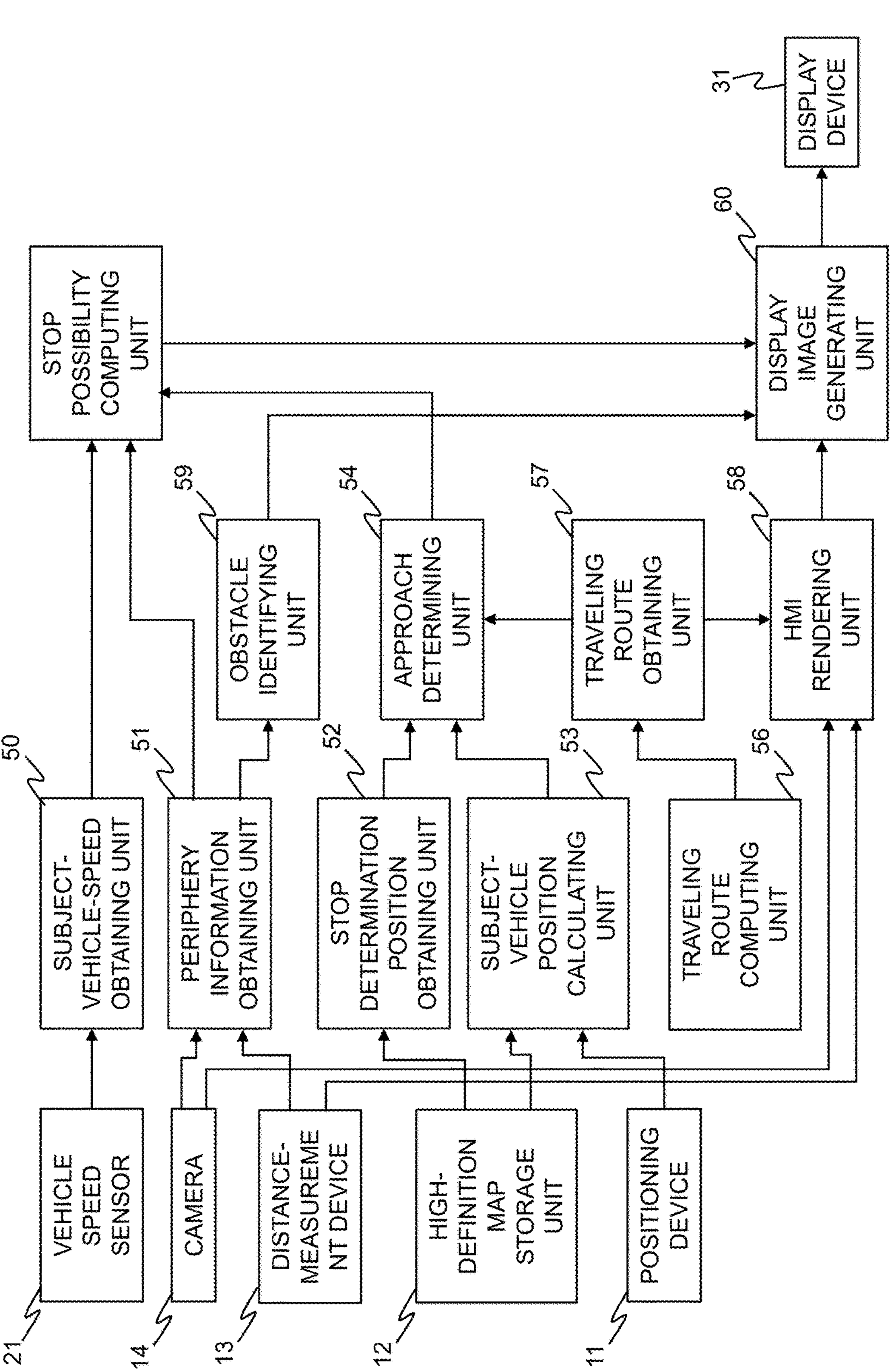
FIG. 2
VEHICLE SPEED SENSOR
21
CAMERA
14
DISTANCE-MEASUREMENT DEVICE
13
HIGH-DEFINITION MAP STORAGE UNIT
12
POSITIONING DEVICE
11
SUBJECT-VEHICLE-SPEED OBTAINING UNIT
50
PERIPHERY INFORMATION OBTAINING UNIT
51
STOP DETERMINATION POSITION OBTAINING UNIT
52
SUBJECT-VEHICLE POSITION CALCULATING UNIT
53
TRAVELING ROUTE COMPUTING UNIT
56
OBSTACLE IDENTIFYING UNIT
59
APPROACH DETERMINING UNIT
54
TRAVELING ROUTE OBTAINING UNIT
57
HMI RENDERING UNIT
58
STOP POSSIBILITY COMPUTING UNIT
DISPLAY IMAGE GENERATING UNIT
60
DISPLAY DEVICE
31

START
S41
IS OBSTACLE POSITIONED WITHIN EXPANDED AREA?
N
Y
S42
IS OBSTACLE SECOND OBSTACLE?
N
Y
S45
IS OBSTACLE FIRST OBSTACLE?
N
Y
S46
IS OBSTACLE WITHIN DISPLAY TARGET RANGE?
N
Y
S43
NOT DISPLAY TARGET
S44
DISPLAY TARGET
S47
DISPLAY TARGET
S48
NOT DISPLAY TARGET
END

DISPLAY CONTROL DEVICE AND DISPLAY CONTROL METHOD

TECHNICAL FIELD

The present invention relates to a display control device and a display control method.

BACKGROUND ART

There has been known an in-vehicle display apparatus that displays a stationary state of a subject vehicle having an automated driving function (e.g., Patent Document 1). During automated driving, when it is determined from the surrounding conditions of the subject vehicle that an obstacle will bring the subject vehicle into a stationary state before the obstacle in the future, the in-vehicle display apparatus causes a display device to display a stop sign extending upward from a road surface in the surrounding conditions.

Prior Art Document

Patent Document

Patent Document 1: JP 2019-27996 A

SUMMARY OF INVENTION

Problems to be Solved by Invention

In the in-vehicle display apparatus described in Patent Document 1, the stop sign for causing the subject vehicle to stop is displayed, but the display device does not display an obstacle on or near a traveling route. Therefore, it is unfortunately difficult to intuitively grasp an obstacle that will affect the traveling of the subject vehicle among obstacles present near the subject vehicle.

A problem to be solved by the present invention is to provide a display control device and a display control method that enable an intuitive grasp of an obstacle that will affect the traveling of a subject vehicle.

Means for Solving Problems

The present invention solves the above problem by: identifying an obstacle from information on a surrounding condition of a subject vehicle; causing a display device to display a traveling route of the subject vehicle and the obstacle positioned within a predetermined expanded area that is the traveling route expanded in a width direction; causing the display device to display a first obstacle approaching the traveling route or possibly approaching the traveling route when the first obstacle is positioned outside the expanded area; and making a degree of display highlighting of a second obstacle moving away from the traveling route or possibly moving away from the traveling route lower than a degree of display highlighting of the obstacle other than the second obstacle or not causing the display device to display the second obstacle when the second obstacle is positioned within the expanded area.

Effects of Invention

According to the present invention, it is possible to intuitively grasp an obstacle that will affect the traveling of a subject vehicle.

BRIEF DESCRIPTION OF DRAWINGS

FIG. 1 is a block diagram illustrating an example of a driver assistance apparatus according to the present embodiment.

FIG. 2 is a block diagram illustrating an example of a controller and the like according to the present embodiment.

MODE(S) FOR CARRYING OUT THE INVENTION

Figure 3:
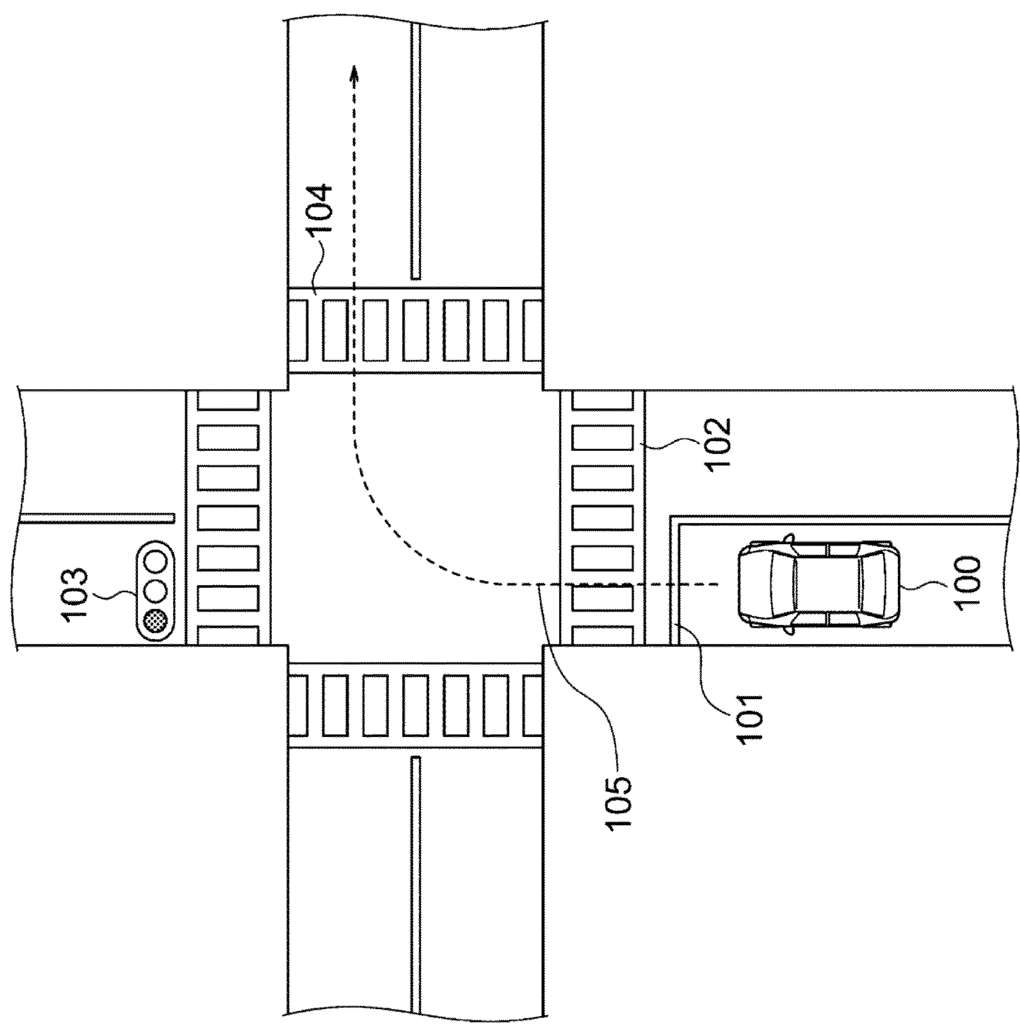
FIG. 3 is a schematic diagram illustrating the situation in which a subject vehicle is approaching an intersection.

Hereinafter, an embodiment of the present invention will be described with reference to the drawings. FIG. 1 is a block diagram illustrating an example of a driver assistance apparatus 1 according to the present embodiment. The driver assistance apparatus 1 performs the automated driving control of a vehicle provided with the driver assistance apparatus 1 (hereinafter, referred to as a "subject vehicle") on the basis of a traveling environment surrounding the subject vehicle. The subject vehicle is capable of traveling under the automated driving control by the driver assistance apparatus 1 or manual driving by a driver. Note that the automated driving control is not limited to system-driven, fully autonomous control. The automated driving control may be what is called driver assistance control, in which part of a driveline, such as steering, is operated by a driver.

The driver assistance apparatus 1 includes surrounding environment sensors 10, a positioning device 11, a high-definition map storage unit 12, vehicle sensors 20, a controller 30, a display device 31, and vehicle control actuators 40. Of these components, for example, the controller 30 is a display control device according to the present embodiment of the present invention. Note that the display control device need not necessarily be provided in the driver assistance apparatus. In other words, the display control device is applicable to not only an automated driving system but also a manual driving system.

The surrounding environment sensors 10 are sensors for detecting an object near the subject vehicle. The object is an obstacle such as a pedestrian, a bicycle, a vehicle, or a motorcycle or an artifact pertaining to traffic such as a traffic lane line, a road marking, or a traffic sign.

The surrounding environment sensors 10 include a distance-measurement device 13, a camera 14, and a communicator 15. The surrounding environment sensors 10 are provided in the vehicle. The surrounding environment sensors 10 output information on the surrounding conditions of the subject vehicle to the controller 30. That is, the information on the surrounding conditions of the subject vehicle includes information detected by the distance measurement device 13 and/or the camera or information received by the communicator 15. The object is detected by, for example, the distance-measurement device 13, the camera 14, and the communicator 15. The distance-measurement device 13 is a device for computing the relative position, the relative distance, the relative velocity, and the like of the object with respect to the subject vehicle. The distance measurement device 13 is, for example, a radar device such as a laser radar, or a sonar.

The camera 14 is a device that recognizes an object near the subject vehicle using an image. Examples of information on the object recognized by the camera 14 include the type of the object, the color of the object (e.g., a lighting color of a traffic signal, such as green, amber, or red), the position of the object, and the relative distance between the subject vehicle and the object.

The distance-measurement device 13 and the camera 14 each output information on the surrounding conditions of the subject vehicle to the controller 30 at predetermined time intervals. The controller 30 can calculate the position of the object on the basis of the relative position (distance and direction) between the subject vehicle and the object detected by the distance-measurement device 13 and/or the camera 14. The controller 30 may add high-definition map information stored in the high-definition map storage unit 12 to the information on the surrounding conditions of the subject vehicle obtained from the distance-measurement device 13 and/or the camera 14 to calculate the position of the object.

The communicator 15 is a device that recognizes an object near the subject vehicle through wireless communication. The communicator 15 is, for example, a piece of equipment connected to the Internet. The communicator 15 may be a piece of equipment that additionally supports a communication standard of vehicle-to-vehicle communication with another vehicle and a communication standard of vehicle-to-infrastructure communication with a road side unit. For example, the communicator 15 may perform the vehicle-to-infrastructure communication with a road side unit (e.g., a traffic signal) near the subject vehicle to receive a lighting color or the like of the traffic signal from the road side unit. The result of detection by the communicator 15 is output to the controller 30 as information on a surrounding condition of the subject vehicle.

The positioning device 11 is a device that measures the current position of the subject vehicle. For example, the positioning device 11 is a global positioning system (GPS) receiver. The positioning device 11 receives satellite signals from a global navigation satellite system at predetermined time intervals and measures the current position of the subject vehicle. The result of the measurement by the positioning device 11 is output to the controller 30.

The high-definition map information stored in the high-definition map storage unit 12 is map information that is higher in definition than conventional navigation map information. The high-definition map information includes lane-level information, which is more detailed than road-level information. As the lane-level information, the high-definition map information includes, for example, information on lane nodes, each of which indicates a reference point on the reference line of a lane (e.g., the center line of the lane), such as an intersection, and information on lane links, each of which indicates segment attributes of a lane between lane nodes. The high-definition map information also includes information on traveling-path boundaries each including a boundary between a traveling path on which the subject vehicle is to travel and the other area. The traveling path on which the subject vehicle is to travel is a road for the subject vehicle to travel. The form of the traveling path is not limited to a particular form. Traveling-path boundaries are present on the right and the left with respect to the proceeding direction of the subject vehicle. The form of the traveling-path boundaries is not limited to a particular form. Examples of the form include road markings (a traffic lane line, a center line, etc.) and roadway structures (a median strip, a guardrail, a curb, a tunnel, or a side wall of an expressway, etc.). Note that at a location where traveling-path boundaries cannot be identified clearly (e.g., a location inside an intersection), traveling-path boundaries are set in advance in the high-definition map information. The traveling-path boundaries set in advance are imaginary traveling-path boundaries and are not actual road markings or actual roadway structures. For example, the high-definition map information includes imaginary traveling-path boundaries inside an intersection for the cases of proceeding straight ahead, making a left turn, and making a right turn.

The vehicle sensors 20 include sensors that detect the traveling state of the subject vehicle and sensors that detect a driving operation by a driver. The sensors detecting the traveling state of the subject vehicle include a vehicle speed sensor 21, an acceleration sensor 22, and a gyro sensor 23. The sensors detecting the driving operation include a steering angle sensor 24, an accelerator sensor 25, and a brake sensor 26.

The vehicle speed sensor 21 detects the wheel speed of the subject vehicle and calculates the speed of the subject vehicle on the basis of the wheel speed. The acceleration sensor 22 detects the acceleration in the front-back direction, the acceleration in the width direction, and the acceleration in the up-down direction of the subject vehicle. The gyro sensor 23 detects angular velocities of rotation angles of the subject vehicle about its three axes: a roll axis, a pitch axis, and a yaw axis.

The steering angle sensor 24 detects a current steering angle, which is the current rotation angle of (the amount of a steering operation on) a steering wheel, which is a steering operation element. The accelerator sensor 25 detects the amount of an accelerator operation (an accelerator position) by a driver. The brake sensor 26 detects the amount of a braking operation by the driver. Information items on the speed, the accelerations, the angular velocities, the steering angle, the amount of an accelerator operation (accelerator position), and the amount of a braking operation of the subject vehicle that are detected by the sensors included in the vehicle sensors 20 will be collectively referred to as "vehicle information." The vehicle sensors 20 output the vehicle information to the controller 30.

The vehicle control actuators 40 are onboard computers such as electronic control units (ECU). The vehicle control actuators 40 control pieces of onboard equipment that govern the traveling of the subject vehicle. The vehicle control actuators 40 include a steering actuator 41 that controls a steering operation of the subject vehicle, and an accelerator position actuator 42 and a brake control actuator 43 that control the traveling speed of the subject vehicle. The steering actuator 41, the accelerator position actuator 42, and the brake control actuator 43 autonomously control the operation of a steering device, a driving device, and a braking device in accordance with control signals received from the controller 30. Thus, the subject vehicle can autonomously travel along a traveling route that is generated by the controller 30.

The steering actuator 41 controls a steering actuator that controls steered wheels in accordance with a steering angle of the steering wheel.

The accelerator position actuator 42 controls the accelerator position of the subject vehicle by controlling an electric motor and/or an internal combustion engine, which are traveling driving sources of the subject vehicle, a power transmission system including a drive shaft and an automatic transmission that transmit output from these traveling driving sources to driving wheels, and a driving device that controls the power transmission system. The brake control actuator 43 controls the braking device that applies brake to wheels of the subject vehicle. In an automated driving mode, the accelerator position actuator 42 and the brake control actuator 43 receive control signals based on a target vehicle speed from the controller 30.

In contrast, in a manual driving mode, the steering actuator 41 receives, for example, a control signal based on the steering angle detected by the vehicle sensors 20 from the controller 30. The accelerator position actuator 42 receives, for example, a control signal based on the accelerator position detected by the vehicle sensors 20 from the controller 30. The brake control actuator 43 receives, for example, a control signal based on the amount of a braking operation detected by the vehicle sensors 20.

The controller 30 is a processing circuit such as an electronic control unit (ECU) that performs driving control on the subject vehicle. The controller 30 is also a processing circuit such as an electronic control unit (ECU) that performs display control for presenting the surrounding environment (surrounding conditions) of the subject vehicle to an occupant. The controller 30 includes peripheral components such as a processor 32 and a storage device 33. The processor 32 includes a processing circuit that runs a program stored in the storage device 33.

An outline of the functions served by the controller 30 will be described. The controller 30 can switch between the automated driving mode in which the subject vehicle is caused to travel under autonomous traveling control and the manual driving mode in which the subject vehicle is caused to travel under manual driving by the driver. Note that the controller 30 is programmed such that the subject vehicle complies with traffic regulations while being caused to travel under the autonomous traveling control.

In the automated driving mode, the controller 30 computes a traveling route along which the subject vehicle is to be caused to travel. The controller 30 drives the vehicle control actuators 40 such that the subject vehicle travels along the traveling route. The controller 30 implements the autonomous control of the steering and the speed of the subject vehicle by calculating control variables and outputting control signals to the vehicle control actuators 40 at predetermined time intervals.

On the basis of information on the surrounding environment detected by the surrounding environment sensors 10, the controller 30 generates a display image (human machine interface (HMI) image) for presenting the surrounding environment (surrounding conditions) of the subject vehicle to a viewer of the display device 31.

FIG. 3 illustrates an example of the situation in which a subject vehicle 100 is traveling along a traveling route 105 under autonomous traveling. As illustrated in the example in FIG. 3, consider the situation in which the subject vehicle 100 enters an intersection from the near side of the intersection and then makes a right turn in the intersection. On the near side of the intersection, a stop line 101 and a crosswalk 102 are present, and on the far side of the intersection, a traffic signal 103 is installed. In addition, ahead of the subject vehicle 100 having made the right turn, a crosswalk 104 is present.

Figure 4A:
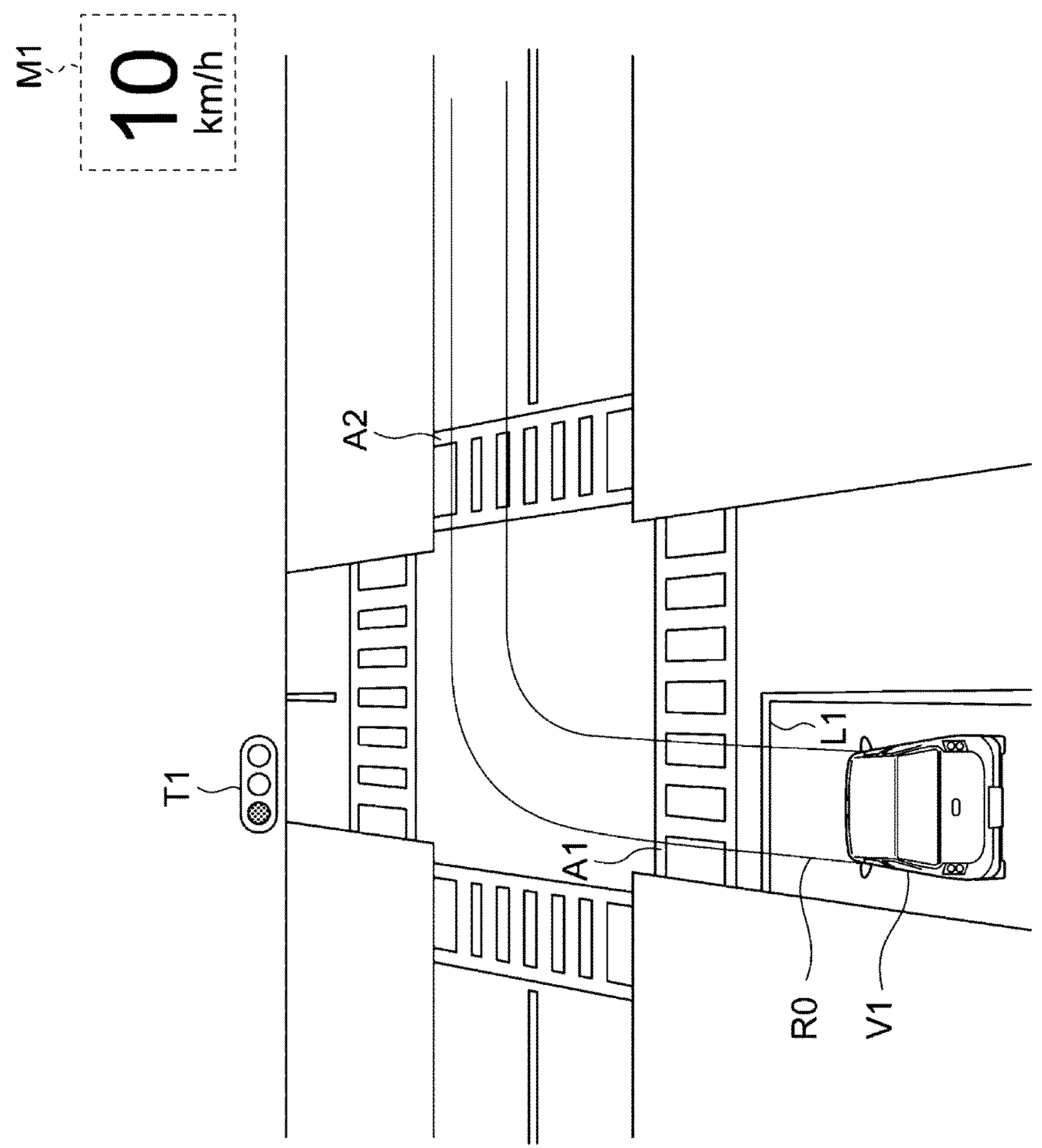
FIG. 4A is an example of a display image according to the present embodiment.

The controller 30 generates a display image for displaying the surrounding conditions of the subject vehicle 100 illustrated in FIG. 3 to an occupant. For example, as illustrated in FIG. 4A, the display image displays a road surface ahead of the subject vehicle 100, and the road surface includes a traveling lane of the subject vehicle 100 and the intersection illustrated in FIG. 3. The display image may be a bird's-eye view image in which the surroundings of the subject vehicle 100 including the front of the subject vehicle 100 are viewed from a virtual view position that is diagonally above and behind the subject vehicle 100. The display image may be a virtual image such as a computer graphics (CG) image or may be an image captured by the camera 14. FIG. 4A is an example of the display image according to the present embodiment.

As illustrated in FIG. 4A, the display image includes a display (subject vehicle icon) V1 that imitates the subject vehicle 100 in FIG. 3, a display (crosswalk icon) A1 that imitates the crosswalk 102 in FIG. 3, a display (traffic signal icon) T1 that imitates the traffic signal 103 in FIG. 3, a display (crosswalk icon) A2 that imitates the crosswalk 104 in FIG. 3, and a display M1 of the current speed of the subject vehicle 100. The display image also includes a display (traveling route image) R0 that imitates the traveling route 105 of the subject vehicle 100 illustrated in FIG. 3. The traveling route image R0 is an image having a width approximately the same as the width of the subject vehicle V1. The shape of the traveling route image R0 conforms to the traveling route 105 illustrated in FIG. 3. The traveling route image R0 may be an image displayed in such a manner as to be superimposed with a specific color so as to be differentiated from the other displays. Although not illustrated in FIG. 3, in the case where an obstacle is present near the subject vehicle, an icon representing the obstacle (e.g., an icon of a vehicle ahead, an oncoming vehicle, a parked vehicle, a motorcycle, a bicycle, a pedestrian, etc.) is displayed on the display device 31.

The controller 30 illustrated in FIG. 1 causes the display device 31 to display the generated display image. The controller 30 further performs a safety check necessary for the subject vehicle to travel along the traveling route under the autonomous traveling, on the basis of the information on the surrounding environment detected by the surrounding environment sensors 10 and the high-definition map information stored in the high-definition map storage unit 12, and causes the display device 31 to display a display image including a traveling route image in which an area where the safety check has been completed is distinguished from the other area on the traveling route of the subject vehicle (the traveling route image after the safety check is completed will be described later).

The display device 31 is provided in the subject vehicle. The display device 31 is, for example, a display device of a navigation device, a display device disposed in a dashboard panel, or a head-up display (HUD) device.

FIG. 2 is a block diagram illustrating an example of the controller and the like according to the present embodiment. As illustrated in FIG. 2, the controller 30 includes a subject-vehicle-speed obtaining unit 50, a periphery information obtaining unit 51, a stop determination position obtaining unit 52, a subject-vehicle position calculating unit 53, an approach determining unit 54, a stop possibility computing unit 55, a traveling route computing unit 56, a traveling route obtaining unit 57, an HMI rendering unit 58, an obstacle identifying unit 59, and a display image generating unit 60. The functions of the blocks illustrated in FIG. 2 are implemented by the processor 32 of the controller 30 executing a computer program stored in the storage device 33.

The subject-vehicle-speed obtaining unit 50 obtains the speed of the subject vehicle detected by the vehicle speed sensor 21. The periphery information obtaining unit 51 obtains the information on the surrounding conditions of the subject vehicle (vehicle periphery information) from the distance-measurement device 13 and the camera 14. The vehicle periphery information includes traffic signal information on a traffic signal ahead of the subject vehicle, information on another vehicle near the subject vehicle such as a vehicle ahead or an oncoming vehicle, and pedestrian information. Note that the periphery information obtaining unit 51 may obtain the vehicle periphery information from the communicator 15.

The stop determination position obtaining unit 52 obtains a stop determination position that is present on the traveling route of the subject vehicle, from the high-definition map information stored in the high-definition map storage unit 12. The stop determination position is a position at which the safety check is likely to be performed in the state where the vehicle is stationary. The stop determination position includes a position at which the vehicle needs to stop and a position at which the possibility that the vehicle will stop changes in accordance with the surrounding conditions of the vehicle. The stop determination position includes at least any one of an intersection, a crosswalk, a merging point, a traffic signal, and a stop line.

This will be described with reference to FIG. 3. When the lighting color of the traffic signal 103 is red, the subject vehicle 100 needs to stop before the stop line 101. The subject vehicle 100 needs to stop in the intersection in accordance with whether an oncoming vehicle is present. For example, in the case where an oncoming vehicle proceeding straight ahead is present, the proceeding straight ahead of the oncoming vehicle has priority over the right turn of the subject vehicle 100, and thus the subject vehicle 100 needs to stop in the intersection. The subject vehicle 100 needs to stop before the crosswalk 104 in accordance with whether a pedestrian crossing the crosswalk 104 is present.

The display control device and a display control method according to the present embodiment can convey information on the possibility that the subject vehicle will stop, a stopping position of the subject vehicle, and the like to a viewer visually in an intuitive manner by indicating the complex and diverse conditions as mentioned above in the traveling route image and causing the display device 31 to display the traveling route image. It is thus possible to increase the number of locations and peripheral environments where the state of a safety check under the autonomous traveling can be adequately conveyed to a viewer. Furthermore, the display control device and the display control method according to the present embodiment can intuitively convey the presence of an obstacle in the periphery of the subject vehicle that will affect the traveling of the subject vehicle to a viewer by causing the display device 31 to display the obstacle in accordance with the relationship between the traveling route of the subject vehicle and the obstacle.

For example, at the timing when the traveling route of the subject vehicle is input from the traveling route obtaining unit 57, the stop determination position obtaining unit 52 obtains the stop determination position present on the traveling route from the high-definition map information. Note that, in the case of a stop determination position near which another stop determination position such as a crosswalk or a traffic signal is present, as in an intersection, the stop determination position obtaining unit 52 may obtain the stop determination positions from the high-definition map information. In the case of the example in FIG. 3, the stop determination position obtaining unit 52 may obtain the positions (sets of position coordinates) of the stop line 101, the crosswalk 102, the traffic signal 103, and the crosswalk 104 as well as the reference point of the intersection (information on a lane node), from the high-definition map information.

The subject-vehicle position calculating unit 53 detects the current position of the subject vehicle on a high-definition map on the basis of positioning information obtained by the positioning device 11 and the high-definition map information stored in the high-definition map storage unit 12.

The approach determining unit 54 determines whether the subject vehicle is approaching a stop determination position on the basis of the stop determination position obtained by the stop determination position obtaining unit 52, the current position of the subject vehicle detected by the subject-vehicle position calculating unit 53, and the traveling route of the subject vehicle input from the traveling route obtaining unit 57. In the case of the example in FIG. 3, the approach determining unit 54 determines whether the subject vehicle 100 is approaching the intersection.

The approach determining unit 54 calculates the distance between the stop determination position and the current position of the subject vehicle. When the calculated distance is less than a predetermined threshold value, the approach determining unit 54 determines that the subject vehicle is approaching the stop determination position. On the other hand, when the distance between the stop determination position and the current position of the subject vehicle is greater than or equal to the predetermined threshold value, the approach determining unit 54 determines that the subject vehicle is not approaching the stop determination position. The predetermined threshold value is a distance that allows the subject vehicle to stop before the stop determination position after the subject vehicle starts deceleration.

When the subject vehicle is determined to be approaching the stop determination position by the approach determining unit 54, the stop possibility computing unit 55 performs a safety check necessary for the subject vehicle to travel along the traveling route under the autonomous traveling, on the basis of the information on the surrounding environment detected by the surrounding environment sensors 10. As a safety check, the stop possibility computing unit 55 determines whether to cause the subject vehicle to stop at the stop determination position. When it is determined that the subject vehicle does not need to stop at the stop determination position, in other words, when the subject vehicle is determined to be able to pass through the stop determination position, the stop possibility computing unit 55 determines that a safety check on the passage of the subject vehicle through the stop determination position has been completed. On the other hand, when it is determined that the subject vehicle needs to stop at the stop determination position, in other words, when the subject vehicle is determined to be unable to pass through the stop determination position, the stop possibility computing unit 55 determines that the safety check on the passage of the subject vehicle through the stop determination position has not been completed.

Factors that cause the subject vehicle to stop (hereinafter, also simply referred to as "stop factors") include a roadway structure such as a stop sign or a traffic signal displaying "do not proceed," and a mobile body crossing the traveling route of the subject vehicle. In the present embodiment, the description will be given with a traffic signal (an example of the roadway structure), and a pedestrian and an oncoming vehicle (examples of the mobile body crossing the traveling route) taken as an example of the stop factors. The stop factors are also referred to as factors that disable the traveling of the subject vehicle along the traveling route under the autonomous traveling, in other words, factors that hinder the proceeding of the subject vehicle under the autonomous traveling.

In the case where safety checks are performed on a plurality of stop factors present near the subject vehicle, the stop possibility computing unit 55 performs a safety check on each of the stop factors. In the example in FIG. 3, stop factors that cause the subject vehicle 100 to stop include the traffic signal 103, an oncoming vehicle (not illustrated) proceeding straight ahead in the intersection, and a pedestrian crossing the crosswalk 104. Examples of safety checks on the respective stop factors will be described.

The stop possibility computing unit 55 performs a safety check on the traffic signal on the basis of traffic signal information, performs a safety check on the pedestrian on the basis of pedestrian information, and performs a safety check on the oncoming vehicle on the basis of oncoming vehicle information.

For example, as the safety check on the traffic signal, the stop possibility computing unit 55 determines whether to cause the subject vehicle to stop at a stop line, in accordance with the lighting color of the traffic signal at the timing when the subject vehicle is determined to be approaching the intersection by the approach determining unit 54. In the case where the lighting color of the traffic signal indicates "do not proceed" (in the case where the lighting color of the traffic signal is red), the stop possibility computing unit 55 determines that the subject vehicle needs to stop at the stop line. On the other hand, in the case where the lighting color of the traffic signal indicates "proceed" for a certain period of time (in the case where the lighting color of the traffic signal is green for a certain period of time), the stop possibility computing unit 55 determines that the subject vehicle does not need to stop at the stop line. Note that in the case where the display of the traffic signal indicates the transition from "proceed" to "do not proceed" (in the case where the lighting color of the traffic signal is amber), the stop possibility computing unit 55 determines that the subject vehicle needs to stop at the stop line.

As the safety check on the pedestrian, the stop possibility computing unit 55 determines whether to cause the subject vehicle to stop before the crosswalk, on the basis of the pedestrian information at the timing when the subject vehicle is determined to be approaching the crosswalk by the approach determining unit 54. For example, the stop possibility computing unit 55 calculates the time remaining before the subject vehicle interferes with the pedestrian (time to collision: TTC), from the relative distance between the subject vehicle and the pedestrian, the moving direction of the pedestrian, the speed of the subject vehicle, and the moving speed of a pedestrian that is determined in advance. In the case where the calculated time remaining is less than a predetermined threshold value, the stop possibility computing unit 55 determines that the subject vehicle needs to stop before the crosswalk. In the case where the calculated time remaining is greater than or equal to the predetermined threshold value, the stop possibility computing unit 55 determines that the subject vehicle does not need to stop before the crosswalk.

As the safety check on the oncoming vehicle, the stop possibility computing unit 55 determines whether to cause the subject vehicle to stop at a predetermined position in the intersection, on the basis of the oncoming vehicle information at the timing when the subject vehicle is determined to be approaching a stop determination position by the approach determining unit 54. For example, the stop possibility computing unit 55 calculates the time remaining before the subject vehicle interferes with the oncoming vehicle (TTC), from the relative distance and the relative velocity between the subject vehicle and the oncoming vehicle. In the case where the calculated time remaining is less than a predetermined threshold value, the stop possibility computing unit 55 determines that the subject vehicle needs to stop at the predetermined position in the intersection. In the case where the calculated time remaining is greater than or equal to the predetermined threshold value, the stop possibility computing unit 55 determines that the subject vehicle does not need to stop at the predetermined position in the intersection. Note that the predetermined threshold value compared with the time remaining may differ between the threshold value used in the safety check on the pedestrian and the threshold value used in the safety check on the oncoming vehicle. The predetermined position in the intersection is a position that is set on the basis of imaginary traveling-path boundaries included in the high-definition map information. The predetermined position is set at a position at which the subject vehicle does not hinder the traveling of the oncoming vehicle (e.g., in the vicinity of the center of the intersection).

In the present embodiment, in the case where there are a plurality of stop factors causing the subject vehicle to stop at a predetermined stop determination position, the stop possibility computing unit 55 performs a safety check on each of the stop factors to determine whether to cause the subject vehicle to stop at the stop determination position.

The traveling route computing unit 56 computes the traveling route of the subject vehicle on a high-definition map stored in the high-definition map storage unit 12, on the basis of the current position of the subject vehicle calculated by the subject-vehicle position calculating unit 53 and a destination that is set in accordance with an operation or the like by an occupant. The traveling route computing unit 56 computes a traveling route indicated on a per-lane basis.

The traveling route obtaining unit 57 obtains the traveling route computed by the traveling route computing unit 56. The traveling route of the subject vehicle obtained by the traveling route obtaining unit 57 is used for not only the autonomous traveling of the subject vehicle in the automated driving mode but also the approach determination by the approach determining unit 54 and the generation of an HMI image by the HMI rendering unit 58.

The HMI rendering unit 58 renders (generates) a display image (base image) that displays the surrounding conditions of the subject vehicle including the conditions in front of the subject vehicle, on the basis of the surrounding conditions of the subject vehicle that are detected by the camera 14 and the distance-measurement device 13. An example of the display image is the display image illustrated in FIG. 4A. The HMI rendering unit 58 updates the display image successively as the subject vehicle moves. In the example in FIG. 3, while the subject vehicle moves along the traveling route 105, the HMI rendering unit 58 updates the base image displaying the surrounding conditions of the subject vehicle as the subject vehicle moves.

The obstacle identifying unit 59 identifies an obstacle on the basis of the vehicle periphery information obtained by the periphery information obtaining unit 51. The obstacle identifying unit 59 identifies an obstacle that will affect the traveling of the subject vehicle (hereinafter, also referred to as a traveling affecting obstacle). The traveling affecting obstacle is determined in accordance with the type of a moving object such as a vehicle or a pedestrian. For example, in the case where the obstacle is a vehicle such as an automobile or a motorcycle, the obstacle identifying unit 59 determines whether the identified obstacle is the traveling affecting obstacle on the basis of the relative position relationship between the traveling route of the subject vehicle and another vehicle, the moving direction of the other vehicle relative to the traveling route, the relative velocity of the other vehicle relative to the subject vehicle, and the like. In the case where the obstacle is an obstacle such as a pedestrian or a bicycle that is likely to approach or enter the traveling route, the obstacle identifying unit 59 determines whether the identified obstacle is the traveling affecting obstacle on the basis of road information on a crosswalk, a bicycle lane, and the like included in the traveling route, the position of the obstacle, or the moving direction of the obstacle.

Figure 5A:
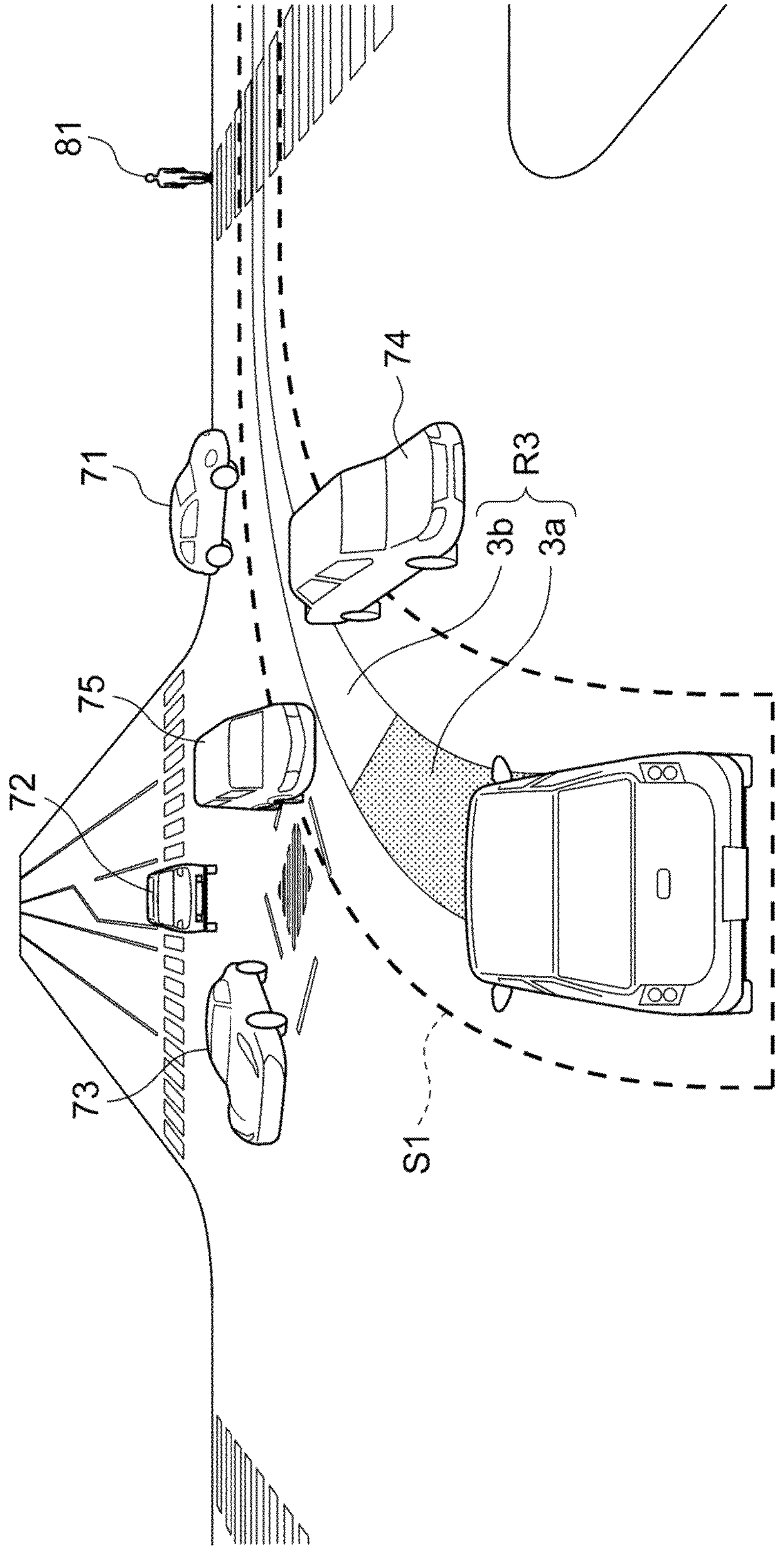
FIG. 5A is a diagram for describing the display image according to the present embodiment.

With reference to FIG. 5A, a method for determining the traveling affecting obstacle will be described. FIG. 5A is an example of the display image according to the present embodiment. Note that FIG. 5A illustrates all obstacles positioned near the subject vehicle, while an actual display screen displays one or more traveling affecting obstacles among the obstacles illustrated in FIG. 5A. The following will describe the determining method with, as an example, the situation in which the subject vehicle 100 enters an intersection from the near side of the intersection and then makes a right turn in the intersection. The following determining method is applicable to not only the scene of the right turn but also another traveling scene.

The method for determining the traveling affecting obstacle differs according to the position relationship between the obstacle and the traveling route. The obstacle identifying unit 59 sets a predetermined expanded area that is the traveling route of the subject vehicle expanded in the width direction of the subject vehicle. The predetermined expanded area is an area that is the traveling route provided with width margins of positional shifts of the subject vehicle in the width direction and that is the traveling route expanded to have a width of 1.5 times the width of the subject vehicle. Note that the degree of the expansion is not necessarily 1.5 times. For example, the degree of the expansion may be 2.0 times. In FIG. 5A, an area S1 enclosed by a dotted line surrounding a traveling route image R1 is equivalent to the expanded area. Note that the expanded area need not necessarily be displayed on the display device 31. In the case where the obstacle is a vehicle, the obstacle identifying unit 59 determines the traveling affecting obstacle in accordance with the position relationship between the expanded area and the obstacle. The obstacle identifying unit 59 changes the method for determining the traveling affecting obstacle in accordance with whether the obstacle is positioned within the expanded area. The following will be described with the case where the obstacle is a vehicle taken as an example.

In the case where the obstacle is positioned outside the expanded area, the obstacle identifying unit 59 determines in principle that the obstacle positioned outside the expanded area is not the traveling affecting obstacle. As an exception, in the case where the obstacle positioned outside the expanded area is approaching the traveling route and/or in the case where the obstacle positioned outside the expanded area is likely to approach the traveling route, the obstacle identifying unit 59 determines the obstacle positioned outside the expanded area to be the traveling affecting obstacle. That is, the obstacle identifying unit 59 determines the obstacle approaching the traveling route or possibly approaching the traveling route (hereinafter, also referred to as a first obstacle) as the traveling affecting obstacle even if the obstacle is positioned outside the expanded area.

The obstacle identifying unit 59 determines whether the obstacle is the first obstacle in accordance with the moving direction of the obstacle and/or the distance from the position of the obstacle to the traveling route of the subject vehicle. In the case where the moving direction of the obstacle is toward the traveling route or in the case where the distance from the position of the obstacle to the traveling route of the subject vehicle is gradually decreasing, the obstacle identifying unit 59 determines the obstacle to be the first obstacle. The obstacle identifying unit 59 also determines whether the obstacle is likely to approach the traveling route, in accordance with a stop factor of the obstacle. For example, in the case where the proceeding direction of another vehicle being stationary is toward the traveling route, and where a stop factor of the other vehicle is a pedestrian on a crosswalk, the other vehicle being stationary is to approach the traveling route after the pedestrian has crossed the crosswalk. In other words, the obstacle identifying unit 59 identifies the proceeding direction of the other vehicle being stationary and the stop factor of the other vehicle, and in the case where the stop factor can be predicted to be eliminated within a predetermined time period, the obstacle identifying unit 59 determines the obstacle being a determination target to be the first obstacle.

In the case where the obstacle is positioned within the expanded area, the obstacle identifying unit 59 determines in principle that the obstacle positioned within the expanded area is the traveling affecting obstacle. As an exception, in the case where the obstacle positioned within the expanded area is moving away from the traveling route and/or in the case where the obstacle positioned within the expanded area is likely to move away from the traveling route, the obstacle identifying unit 59 determines the obstacle positioned within the expanded area not to be the traveling affecting obstacle. That is, the obstacle identifying unit 59 determines the obstacle moving away from the traveling route or possibly moving away from the traveling route (hereinafter, also referred to as a second obstacle) not to be the traveling affecting obstacle even if the obstacle is positioned within the expanded area.

The obstacle identifying unit 59 determines whether the obstacle is the second obstacle in accordance with the moving direction of the obstacle and/or the distance from the position of the obstacle to the traveling route of the subject vehicle. In the case where the moving direction of the obstacle is a direction of moving away from the traveling route or in the case where the distance from the position of the obstacle to the traveling route of the subject vehicle is gradually increasing, the obstacle identifying unit 59 determines the obstacle to be the second obstacle. The obstacle identifying unit 59 also determines whether the obstacle is likely to move away from the traveling route, in accordance with a stop factor of the obstacle. For example, in the case where the proceeding direction of another vehicle being stationary is a direction of moving away from the traveling route, where a stop factor of the other vehicle is a vehicle ahead of the other vehicle, and where the vehicle ahead has started moving, the other vehicle being stationary is to travel following the vehicle ahead, thus moving away from the traveling route. In other words, the obstacle identifying unit 59 identifies the proceeding direction of the other vehicle being stationary and the stop factor of the other vehicle, and in the case where the stop factor can be predicted to be eliminated within a predetermined time period, the obstacle identifying unit 59 determines the obstacle being a determination target to be the second obstacle.

Among obstacles positioned outside the expanded area, the obstacle identifying unit 59 determines an obstacle corresponding to the first obstacle as the traveling affecting obstacle and determines another obstacle not corresponding to the first obstacle not to be the traveling affecting obstacle. Among the obstacles positioned outside the expanded area, the other obstacle not corresponding to the first obstacle is an obstacle being stationary outside the expanded area or an obstacle not approaching the subject vehicle or the traveling route of the subject vehicle.

Among the obstacles positioned within the expanded area, the obstacle identifying unit 59 determines an obstacle corresponding to the second obstacle not to be the traveling affecting obstacle and determines another obstacle not corresponding to the second obstacle to be the traveling affecting obstacle. Among the obstacles positioned within the expanded area, the other obstacle not corresponding to the second obstacle is an obstacle being stationary within the expanded area or an obstacle not moving away from the traveling route of the subject vehicle.

The results of determining the attributes of vehicles in the traveling scene in FIG. 5A will be described. The attributes of vehicles are categorized into the first obstacle, the second obstacle, and an obstacle that corresponds to neither the first obstacle nor the second obstacle. First, vehicles 71 to 73 positioned outside the expanded area (S1) will be described. The vehicle 71 is stationary outside the expanded area (S1), and a stop factor of the vehicle 71 is a crosswalk ahead of the vehicle 71 and a pedestrian 81 in the vicinity of a crosswalk (T1). After the pedestrian 81 crosses the crosswalk (T1) or after the pedestrian 81 moves away from the crosswalk (T1), the stop factor is eliminated, and the vehicle 71 is likely to approach the traveling route. Therefore, the vehicle 71 is determined to be the first obstacle (the traveling affecting obstacle). The vehicle 72 is an oncoming vehicle for the subject vehicle. The vehicle 72 is stationary on a right-turn lane of an opposite lane and is to move away from the traveling route of the subject vehicle. The vehicle 73 is a vehicle being traveling. The vehicle 73 is to move away from the traveling route after making a right turn. Therefore, the vehicles 72 and 73 are determined to be vehicles each not corresponding to the first obstacle (obstacles not affecting the traveling of the subject vehicle).

Next, vehicles 74 and 75 positioned within the expanded area (S1) will be described. The vehicle 74 is traveling within the expanded area, and the proceeding direction of the vehicle 74 is a direction of moving away from the traveling route of the subject vehicle. Therefore, the vehicle 74 is determined to be the second obstacle (an obstacle not affecting the traveling of the subject vehicle). The vehicle 75 is traveling within the expanded area and is traveling toward the traveling route of the subject vehicle. Therefore, the vehicle 75 is determined to be a vehicle not corresponding to the second obstacle (the traveling affecting obstacle).

Next, the case where the obstacle is an obstacle such as a pedestrian or a bicycle that is likely to approach or enter the traveling route will be described as an example.

In the case where the obstacle is a pedestrian, a bicycle, or the like, the obstacle identifying unit 59 specifies an area that the pedestrian or the like is likely to pass (hereinafter, also referred to as a passable area) in the traveling route. For example, a crosswalk, a bicycle traveling road, or the vicinity of an area where a vehicle can be parked or stationary on a road corresponds to the passable area. In addition, the obstacle identifying unit 59 determines whether a traffic signal is installed in the vicinity of the crosswalk from the vehicle periphery information and/or the map information. The obstacle identifying unit 59 determines whether the obstacle is the traveling affecting obstacle from the position relationship between the position of the obstacle and the passable area. In the case where the obstacle is positioned within the passable area, the obstacle identifying unit 59 determines the obstacle to be the traveling affecting obstacle.

In the case where the obstacle is positioned in the vicinity of the passable area, the obstacle identifying unit 59 determines whether the obstacle is likely to enter the passable area. For example, in the case where the passable area is a crosswalk, the obstacle identifying unit 59 determines whether a traffic signal is set at the crosswalk. In the case where a traffic signal is installed, when the lighting color of the traffic signal is green, the obstacle identifying unit 59 determines that the obstacle is likely to enter the passable area. In the case where the pedestrian is positioned in the vicinity of the passable area and determined to be likely to enter the passable area, the obstacle identifying unit 59 identifies the pedestrian as the traveling affecting obstacle. In the case where no traffic signal is installed, the obstacle identifying unit 59 determines that the obstacle is likely to enter the passable area. In other words, the obstacle identifying unit 59 identifies a crosswalk at which no traffic signal is installed on the basis of the vehicle periphery information and/or the map information and determines whether a pedestrian or a bicycle approaching the crosswalk is present on the basis of the vehicle periphery information. The obstacle identifying unit 59 then identifies the pedestrian or the bicycle approaching the crosswalk as the traveling affecting obstacle.

The result of determining the pedestrian in the traveling scene in FIG. 5A will be described. The pedestrian 81 is present in the vicinity of the crosswalk (T1). In the traveling scene in FIG. 5A, the lighting color of a traffic signal installed at the crosswalk (T1) is green (proceed), and thus the pedestrian is likely to enter the crosswalk. Therefore, the pedestrian is determined to be the traveling affecting obstacle.

The display image generating unit 60 generates a traveling route image in which an area where a safety check necessary for the subject vehicle to travel along the traveling route under the autonomous traveling has been completed is distinguished from the other area on the traveling route, in accordance with the result of the determination by the approach determining unit 54 and the result of the determination by the stop possibility computing unit 55.

In the case where the subject vehicle is determined to be approaching a stop determination position by the approach determining unit 54, the display image generating unit 60 sets an area from the current position of the subject vehicle to the stop determination position as a proceeding-allowed area and sets an area farther from the stop determination position as a proceeding-disallowed area, on the traveling route of the subject vehicle. As the traveling route image in which the proceeding-allowed area and the proceeding-disallowed area are distinguished from each other, the display image generating unit 60 generates a traveling route image in which the proceeding-allowed area and the proceeding-disallowed area differ from each other in at least any one of color, pattern, and lightness.

Figure 4B:
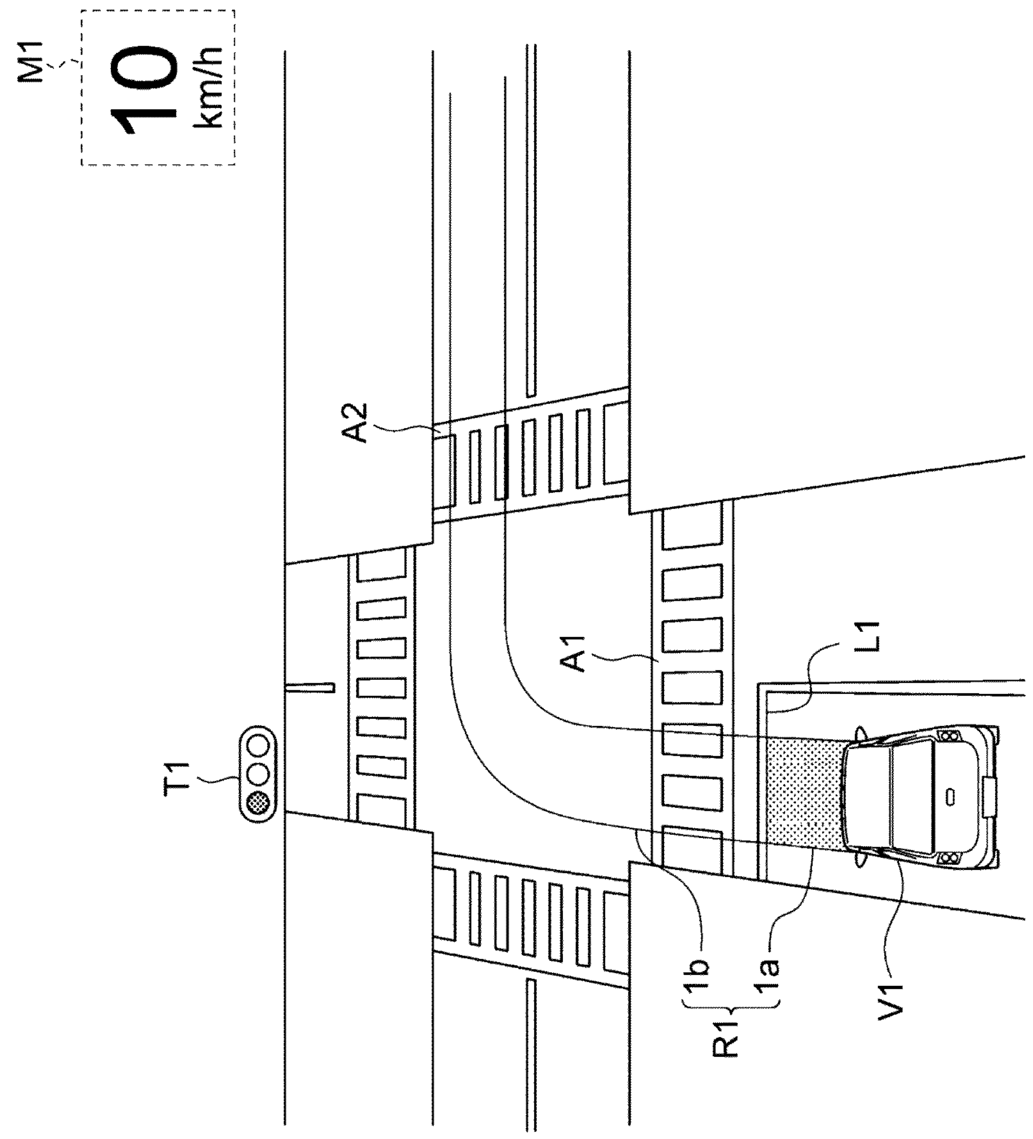
FIG. 4B is an example of the display image according to the present embodiment.

For example, in FIG. 3, consider the situation in which the subject vehicle 100 is traveling before the stop line 101. When the subject vehicle 100 is determined to be approaching the intersection (the stop line 101) by the approach determining unit 54, the display image generating unit 60 generates, for example, as illustrated in FIG. 4B, a traveling route image R1 in which a proceeding-allowed area 1*a* from a subject vehicle icon V1 to a stop line icon L1 is distinguished from a proceeding-disallowed area 1*b*. The display image generating unit 60 generates the traveling route image R1 in which, for example, the proceeding-allowed area 1*a* and the proceeding-disallowed area 1*b* are made different from each other in color such that the proceeding-allowed area 1*a* is highlighted more than the proceeding-disallowed area 1*b*. The display image generating unit 60 causes the display device 31 to display the display image with the traveling route image R1 superimposed on the base image. FIG. 4B is an example of the display image in the situation in which the subject vehicle 100 is traveling before the stop line 101 in FIG. 3.

When a safety check on a stop factor is completed by the stop possibility computing unit 55, the display image generating unit 60 generates a traveling route image in which the boundary between the proceeding-allowed area and the proceeding-disallowed area is moved in the proceeding direction of the subject vehicle from the traveling route image before the safety check is performed. Every time a safety check on a stop factor in the proceeding direction of the subject vehicle is completed, the display image generating unit 60 generates a traveling route image in which the proceeding-allowed area is extended in the proceeding direction of the subject vehicle and causes the display device 31 to display the traveling route image with the traveling route image superimposed on the base image. Thus, the proceeding allowed area in the traveling route image is extended every time a determination result indicating the completion of a safety check is obtained, which makes it easy for a viewer of the display image to intuitively grasp that the subject vehicle is traveling within the proceeding allowed area along the traveling route under the autonomous traveling.

In contrast, until a safety check on a stop factor is completed by the stop possibility computing unit 55, the display image generating unit 60 generates a traveling route image in which the boundary between the proceeding-allowed area and the proceeding-disallowed area remains unchanged from the traveling route image before the safety check is performed, and then the display image generating unit 60 causes the display device 31 to display the traveling route image. Thus, the proceeding-allowed area in the traveling route image is kept until a determination result indicating the completion of the safety check is obtained, which makes it easy for a viewer of the display image to intuitively grasp that the subject vehicle is to stop at the boundary between the proceeding-allowed area and the proceeding-disallowed area under the autonomous traveling.

In the case where the obstacle identifying unit 59 identifies a traveling affecting obstacle, the display image generating unit 60 generates the image of the traveling affecting obstacle. The display image generating unit 60 causes the display device 31 to display the image of the traveling affecting obstacle superimposed on an image in which the traveling route image is superimposed on the base image.

Figure 5B:
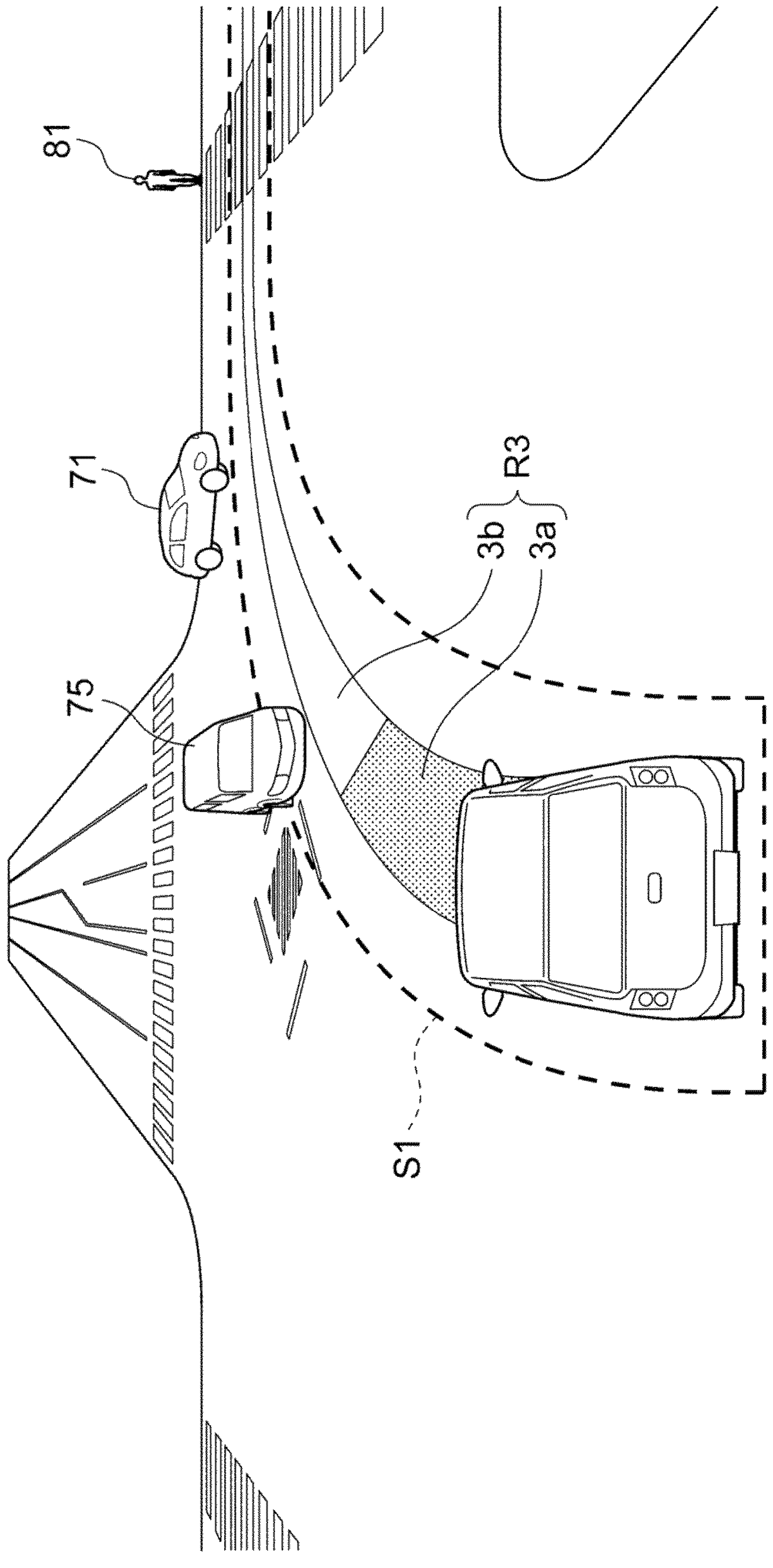
FIG. 5B is an example of the display image according to the present embodiment.

With reference to FIG. 5B, the display mode of the display image including a traveling affecting obstacle will be described. FIG. 5B is an example of the display image according to the present embodiment. Note that FIG. 5B does not illustrate obstacles not displayed on the display screen among the obstacles illustrated in FIG. 5A. FIG. 5B is equivalent to an actual display screen. Since the vehicles 71 and 75, and the pedestrian 81 illustrated in FIG. 5A correspond to traveling affecting obstacles, they are displayed on the display device 31 as illustrated in FIG. 5B. In contrast, since the vehicles 72 to 74 illustrated in FIG. 5A do not correspond to traveling affecting obstacles, they are not displayed on the display device 31 as illustrated in FIG. 5B.

The display image generating unit 60 generates the images of obstacles such that traveling affecting obstacles are displayed on the display device 31, and such that obstacles not corresponding to traveling affecting obstacles are displayed on the display device 31. Alternatively, among obstacles near the subject vehicle, the display image generating unit 60 may give a higher degree of display highlighting to an obstacle determined to be a traveling affecting obstacle and give a lower degree of display highlighting to an obstacle determined not to be a traveling affecting obstacle. That is, the display mode may be such a display mode that can distinguish whether or not an obstacle near the subject vehicle is a traveling affecting obstacle on the basis of how high the degree of display highlighting of the obstacle is. The degree of display highlighting represents a visual impact in the display screen and is expressed with the color of an image, the shape of the image, the size of the image, or a combination of these elements. Note that degrees of highlighting using the colors of images may be distinguished from one another with hues and color tones (lightnesses, saturations).

For example, in the case where the display image generating unit 60 displays an obstacle positioned outside the expanded area, and the obstacle corresponds to the first obstacle, the display image generating unit 60 can increase the degree of display highlighting of the obstacle than when the obstacle does not correspond to the first obstacle. That is, when the first obstacle is positioned outside the expanded area, the display image generating unit 60 causes the display device 31 to display the obstacle such that the degree of display highlighting of the first obstacle is made higher than the degree of display highlighting of another obstacle, other than the first obstacle.

For example, in the case where the display image generating unit 60 displays an obstacle positioned within the expanded area, and the obstacle corresponds to the second obstacle, the display image generating unit 60 can reduce the degree of display highlighting of the obstacle than when the obstacle does not correspond to the second obstacle. That is, when the second obstacle is positioned within the expanded area, the display image generating unit 60 causes the display device 31 to display the obstacle such that the degree of display highlighting of the second obstacle is made lower than the degree of display highlighting of another obstacle, other than the second obstacle. Thus, the display of the traveling affecting obstacle is highlighted more than another obstacle on the screen of the display device 31.

Figure 6:
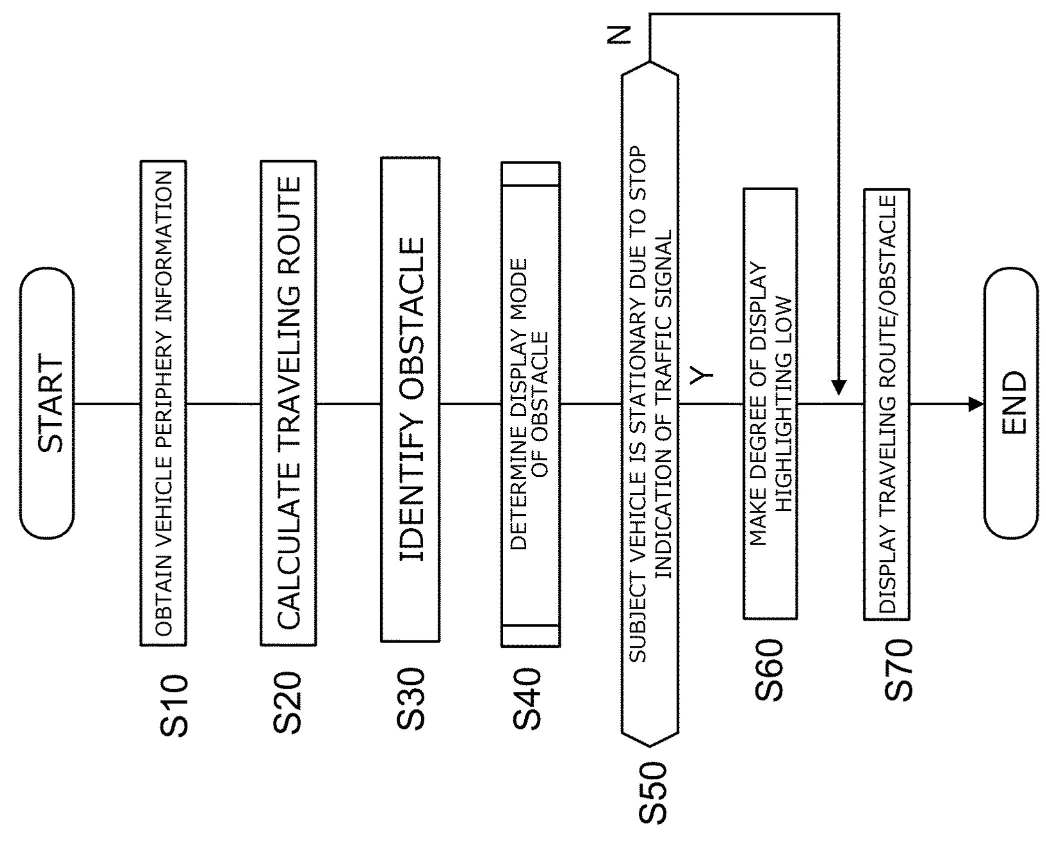
FIG. 6 is a flowchart illustrating control processing pertaining to displaying a traveling route and an obstacle.
Figure 7:
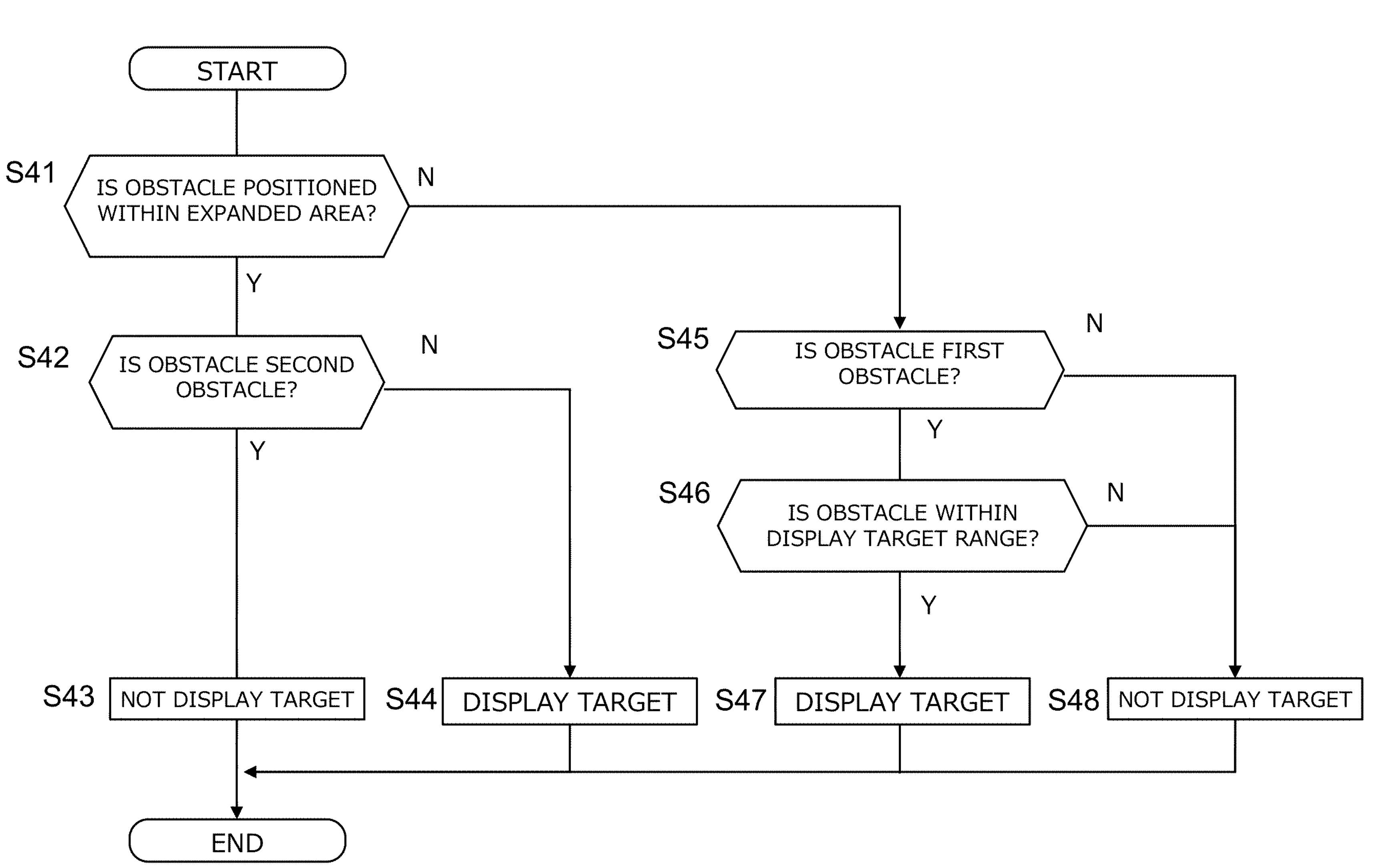
FIG. 7 is a flowchart illustrating a sub-flow of step S40 illustrated in FIG. 6.

Next, with reference to FIG. 6 and FIG. 7, a control flow pertaining to the displaying of a traveling route and an obstacle (a vehicle) in control processing by the controller 30 will be described. FIG. 6 is a flowchart illustrating the control processing by the controller 30. FIG. 7 is a sub-flowchart of step S40 illustrated in FIG. 6.

In step S10, the controller 30 obtains information on the surrounding conditions of the subject vehicle (the vehicle periphery information). In step S20, the controller 30 obtains the traveling route of the subject vehicle. In step S30, the controller 30 identifies an obstacle positioned near the subject vehicle from the vehicle periphery information.

In step S40, the display mode of the obstacle is determined. With reference to FIG. 7, a flow of determining the display mode of the obstacle will be described. In the case where a plurality of obstacles are identified, the controller 30 executes the following sub-flow for each of the plurality of obstacles.

In step S41, the controller 30 compares the position of the obstacle positioned near the subject vehicle with the expanded area to determine whether the obstacle is positioned within the expanded area. When the obstacle is positioned within the expanded area, the controller 30 determines in step 42 whether the obstacle being a determination target is the second obstacle. When the obstacle being a determination target is the second obstacle, the controller 30 determines in step S43 that the obstacle being a determination target is not the traveling affecting obstacle. That is, the controller 30 determines the obstacle being a determination target not to be a display target of the display device 31.

When the obstacle being a determination target is determined not to be the second obstacle in the determination flow of step S42, the controller 30 determines in step S44 that the obstacle being a determination target is the traveling affecting obstacle. That is, the controller 30 determines the obstacle being a determination target to be a display target of the display device 31.

When the obstacle is determined to be positioned outside the expanded area in the determination flow of step S41, the controller 30 determines in step 45 whether the obstacle being a determination target is the first obstacle. When the obstacle being a determination target is the first obstacle, the controller 30 determines in step S46 whether the obstacle being a determination target is within a display target range. The display target range indicates a range of display limitation for the display device 31 in an area surrounding the subject vehicle. The display target range may be set by a system or may be arbitrarily set by a user. When the obstacle being a determination target is within the display target range, the controller 30 determines, in step S47, the obstacle being a determination target to be the traveling affecting obstacle. That is, the controller 30 determines the obstacle being a determination target to be a display target of the display device 31.

When the obstacle being a determination target is determined not to be the first obstacle in the determination flow of step S45 or when the obstacle being a determination target is determined to be outside the display target range in the determination flow of step S46, the controller 30 determines, in step S48, the obstacle being a determination target not to be the traveling affecting obstacle. That is, the controller 30 determines the obstacle being a determination target not to be a display target of the display device 31. After finishing the processing of the sub-flow of steps S41 to S48, the controller executes the control flow of step S50.

In step S50, the controller 30 obtains information on a traffic signal positioned in front of the subject vehicle and determines whether the subject vehicle is stationary due to a stop indication of the traffic signal. When the subject vehicle is stationary due to the stop indication of the traffic signal, the controller 30 reduces, in the step S60, the degree of display highlighting of the obstacle compared to when the traffic signal gives an indication other than the stop indication. When the traffic signal gives an indication other than the stop indication, the controller 30 executes the control flow of step S70 without making the degree of display highlighting of the obstacle low. In step S70, the controller 30 causes the display device 31 to display the traveling route and the obstacle that has been determined to be a display target.

As described above, the display control device and the display control method according to the present embodiment obtain the information on the surrounding conditions of the subject vehicle, identify an obstacle from the information on the surrounding conditions of the subject vehicle, obtain the traveling route of the subject vehicle, and cause the display device 31 to display the traveling route and an obstacle positioned within the predetermined expanded area that is the traveling route expanded in the width direction. When the first obstacle is positioned outside the expanded area, the first obstacle is displayed on the display device 31. When the second obstacle is positioned within the expanded area, the degree of display highlighting of the second obstacle is lower than the degree of display highlighting of another obstacle, other than the second obstacle, or the second obstacle is not displayed on the display device. Thus, a viewer can intuitively grasp an obstacle that will affect the traveling of the subject vehicle. As a result, it is possible to enhance operability for a driver being the viewer.

In the present embodiment, the controller 30 obtains the information on the traffic signal positioned in front of the subject vehicle, and when the traffic signal gives the stop indication, the controller 30 reduces the degree of display highlighting of the obstacle when the traffic signal indicates a stop indication, compared to when the traffic signal indicates an indication other than the stop indication Thus, the displaying of unnecessary information on the display device in a highlighted manner is prevented. As a result, the displaying of unnecessary information in a highlighted manner, which puts a burden on a viewer, is prevented.

In the present embodiment, the controller 30 obtains the information on the surrounding conditions of the subject vehicle and the map information, identifies a crosswalk at which no traffic signal is installed on the basis of the information on the surrounding conditions of the subject vehicle and/or the map information, determines whether the pedestrian or the obstacle approaching the crosswalk is present on the basis of the information on the surrounding conditions, and causes the display device 31 to display the pedestrian or the obstacle when the pedestrian or the obstacle is determined to be present. Thus, it is possible to intuitively grasp the pedestrian or the obstacle approaching the crosswalk.

As a modification of the present embodiment, in the case where a predetermined area in which a safety check has been completed (equivalent to a "first area") and the other area, other than the predetermined area, (equivalent to a "second area") are present on the traveling route, the controller 30 may reduce the size of an expanded area including the predetermined area than the size of an expanded area including the other area. For example, in FIG. 5A and FIG. 5B, a first expanded area, which is a proceeding-disallowed area 3*a* being expanded, and an expanded area that is a proceeding-allowed area 3*b* being expanded are compared with each other, and the width of the first expanded area, which is the proceeding-allowed area 3*a* being expanded, is made small. In the proceeding-allowed area 3*a*, the safety check has been finished. Thus, narrowing an area for displaying an obstacle is less likely to affect the operation by a driver. Thus, the number of obstacles displayed near the subject vehicle is reduced, and it is possible to reduce the degree of causing a sense of obtrusiveness from the displaying.

As a modification of the present embodiment, when a first obstacle positioned outside the expanded area is displayed on the display device 31, the controller 30 may cause the display device to display the first obstacle when the relative velocity of the first obstacle relative to the subject vehicle is higher than a predetermined relative velocity threshold value. The first obstacle positioned outside the expanded area means that the first obstacle is approaching the traveling route of the subject vehicle from the outside of the expanded area. In addition, when the relative velocity of the first obstacle relative to the subject vehicle is high, the first obstacle is likely to approach the traveling route in a shorter time. Therefore, in the modification, the first obstacle having a high relative velocity is displayed on the display device 31. Note that the controller 30 may increase the degree of display highlighting of a first obstacle having a high relative velocity than the degree of display highlighting of a first obstacle having a low relative velocity. Thus, it is possible to expand an area for displaying an obstacle in accordance with the possibility that the obstacle will approach the subject vehicle.

As a modification of the present embodiment, when a second obstacle positioned within the expanded area is displayed on the display device 31, the controller 30 may reduce the degree of display highlighting of the second obstacle as the second obstacle moves away from the traveling route. In other words, as the second obstacle moves away from the traveling route with the passage of time, the influence of the second obstacle on the traveling of the subject vehicle decreases. Thus, the degree of display highlighting of the second obstacle is made lower so as to reduce the number of targets that a viewer should watch carefully. Thus, a burden on a viewer can be reduced.

As a modification of the present embodiment, in the case where a new first obstacle is displayed on the display device 31 due to an obstacle positioned outside the expanded area, newly corresponding to the first obstacle, the controller 30 may increase the degree of display highlighting of the first obstacle as the first obstacle approaches the traveling route. For example, in the case where an obstacle positioned outside the expanded area starts approaching the traveling route from the state where the obstacle is away from the traveling route or the state where the obstacle is stationary, the obstacle becomes a display target of the display device 31 due to the obstacle newly corresponding to the first obstacle. At this time, from the state where the obstacle is not displayed, the controller 30 causes the display device 31 to display the new first obstacle while gradually making the degree of highlighting of the obstacle higher. Thus, it is possible to express the proximity of the first obstacle to the traveling route in the form of the degree of highlighting.

DESCRIPTION OF REFERENCE NUMERALS

1 driver assistance apparatus
10 surrounding environment sensors
11 positioning device
12 high-definition map storage unit
13 distance-measurement device
14 camera
15 communicator
30 controller
31 display device
59 obstacle identifying unit
60 display image generating unit

The invention claimed is:

1. A display control device comprising a controller that controls a display device, wherein the controller:
- obtains information on a surrounding condition of a subject vehicle;
- identifies an obstacle from the information on the surrounding condition;
- obtains a traveling route of the subject vehicle;
- causes the display device to display the obstacle and the traveling route, the obstacle being positioned within a predetermined expanded area in which the traveling route is expanded in a width direction;
- performs a safety check necessary for the subject vehicle to travel along the traveling route under autonomous traveling, on a basis of the surrounding condition; and
- reduces a size of the expanded area including a first area in which the safety check has been completed than a size of the expanded area including a second area other than the first area when the first area and the second area are present on the traveling route,
- wherein a first obstacle approaching the traveling route or possibly approaching the traveling route is displayed on the display device when the first obstacle is positioned outside the expanded area, and
- wherein a degree of display highlighting of a second obstacle moving away from the traveling route or possibly moving away from the traveling route is lower than a degree of display highlighting of the obstacle other than the second obstacle, or the second obstacle is not displayed on the display device, when the second obstacle is positioned within the expanded area.

2. A display control device comprising a controller that controls a display device, wherein the controller:
- obtains information on a surrounding condition of a subject vehicle;
- identifies an obstacle from the information on the surrounding condition;
- obtains a traveling route of the subject vehicle; and
- causes the display device to display the obstacle and the traveling route, the obstacle being positioned within a predetermined expanded area in which the traveling route is expanded in a width direction,
- wherein a first obstacle approaching the traveling route or possibly approaching the traveling route is displayed on the display device when the first obstacle is positioned outside the expanded area,
- wherein the first obstacle having a relative velocity relative to the subject vehicle higher than a predetermined relative velocity threshold value when the first obstacle positioned outside the expanded area is displayed on the display device, and
- wherein a degree of display highlighting of a second obstacle moving away from the traveling route or possibly moving away from the traveling route is lower than a degree of display highlighting of the obstacle other than the second obstacle, or the second obstacle is not displayed on the display device, when the second obstacle is positioned within the expanded area.

3. The display control device according to claim 1, wherein the controller:
- obtains information on a traffic signal positioned in front of the subject vehicle; and
- reduces a degree of displaying highlighting of the obstacle when the traffic signal indicates a stop indication, compared to when the traffic signal indicates an indication other than the stop indication.

4. The display control device according to claim 1, wherein the controller:
- obtains map information;
- identifies a crosswalk at which no traffic signal is installed, on a basis of the information on the surrounding condition of the subject vehicle and/or the map information;

determines whether a pedestrian or a bicycle approaching the crosswalk is present, on a basis of the information on the surrounding condition; and causes the display device to display the pedestrian or the bicycle when the pedestrian or the bicycle is determined to be present.

5. The display control device according to claim 1, wherein the controller reduces a degree of display highlighting of the second obstacle as the second obstacle moves away from the traveling route, when the second obstacle positioned within the expanded area is displayed on the display device.

6. The display control device according to claim 1, wherein in a case where a new first obstacle is displayed on the display device due to the obstacle positioned outside the expanded area, newly corresponding to the first obstacle, the controller increases a degree of display highlighting of the first obstacle as the first obstacle approaches the traveling route.

7. A display control method to be executed by a controller, the display control method comprising, by the controller:

obtaining information on a surrounding condition of a subject vehicle;

identifying an obstacle from the information on the surrounding condition;

obtaining a traveling route of the subject vehicle;

causing a display device to display the obstacle and the traveling route, the obstacle being positioned within a predetermined expanded area in which the traveling route is expanded in a width direction;

performing a safety check necessary for the subject vehicle to travel along the traveling route under autonomous traveling, on a basis of the surrounding condition; and reducing a size of the expanded area including a first area in which the safety check has been completed than a size of the expanded area including a second area other than the first area when the first area and the second area are present on the traveling route, wherein a first obstacle approaching the traveling route or possibly approaching the traveling route is displayed on the display device when the first obstacle is positioned outside the expanded area, and wherein a degree of display highlighting of a second obstacle moving away from the traveling route or possibly moving away from the traveling route is lower than a degree of display highlighting of the obstacle other than the second obstacle, or the second obstacle is not displayed on the display device, when the second obstacle is positioned within the expanded area.

* * * * *